United States Patent [19]

Knaack

[11] 3,728,417
[45] Apr. 17, 1973

[54] PERESTER FREE RADICAL INITIATOR FOR GRAFT POLYMERIZATION
[75] Inventor: Donald F. Knaack, Wilmington, Del.
[73] Assignee: Avisum Corporation, Philadelphia, Pa.
[22] Filed: Dec. 5, 1968
[21] Appl. No.: 781,573

[52] U.S. Cl. ............... 260/878, 260/29.6, 260/32.6, 260/32.8, 260/33.4, 260/896, 260/897
[51] Int. Cl. ............................................. C08f 15/04
[58] Field of Search ....................................... 260/878

[56] References Cited

UNITED STATES PATENTS

| 3,049,507 | 8/1962 | Stanton et al. | 260/45.5 |
|---|---|---|---|
| 3,073,667 | 1/1963 | Bonvicini et al. | 8/115.5 |
| 3,322,712 | 5/1967 | Gardner et al. | 260/29.6 |
| 2,858,326 | 10/1958 | Ashby | 260/453 |

FOREIGN PATENTS OR APPLICATIONS 1,198,067  8/1965  Germany

*Primary Examiner*—Harry Wong, Jr.
*Attorney*—Roger V. N. Powelson, Arthur G. Gilkes, Charles E. Feeny and John C. Martin, Jr.

[57] ABSTRACT

A polyolefin graft polymer is prepared by the graft polymerization of at least one ethylenically unsaturated monomer onto a polyolefin using a perester free radical initiator selected from the group consisting of t-butyl 2-ethylperhexanoate, t-amyl 2-ethylperhexanoate, t-butyl 3,5,5-trimethylperhexanoate, t-amyl 3,5,5-trimethylperhexanoate, t-butyl 2-ethylperbutyrate, t-amyl 2-ethylperbutyrate, t-butyl perisobutyrate and t-amyl periso butyrate.

10 Claims, No Drawings

PERESTER FREE RADICAL INITIATOR FOR GRAFT POLYMERIZATION

BACKGROUND OF THE INVENTION

This invention relates to a method of preparing graft polymerized polyolefins having improved dye receptivity and particularly to polyolefins containing crystalline polypropylene.

It is well known that hydrocarbon polymers of the non-aromatic type are very difficult to dye. Ample evidence is available in the technical literature that illustrates the fact that polyolefins exhibit little or no receptivity for dyestuffs when conventional procedures are employed. Several approaches have been proposed to remedy the problem of poor dye characteristics of polyolefins. One method involves the preparation of graft copolymers wherein a dyeable polymer such as vinyl pyridine has been grafted onto a polyolefin backbone. This technique is described in U.S. Pat. Nos. 3,049,508 and 3,073,667. Another approach is to prepare a blend of a polyolefin and a polymer that is more dyeable than the polyolefin such as a vinyl pyridine homopolymer and this method is described in U.S. Pat. No. 3,315,014.

An improved polyolefin composition has been obtained by the practice of this invention wherein a monoethylenically unsaturated, heterocyclic, nitrogen-containing monomer either alone or together with one or more other ethylenically unsaturated monomers is grafted onto a polyolefin backbone using particular perester free radical initiators for the graft polymerization. When these initiators are employed to prepare dyeable polyolefin compositions, and particularly dyeable polypropylene compositions, excellent properties of the resultant dyed composition are obtained. Certain of these perester initiators are known in the art as having utility in the random polymerization of various vinyl monomers, and this teaching is described in West German Pat. No. 1,198,067. But heretofore these peresters have not been described as efficient free radical initiators for graft polymerization to produce dyeable polyolefins.

SUMMARY OF THE INVENTION

It is an object of this invention to graft polymerize at least one ethylenically unsaturated monomer onto a polyolefin backbone using certain perester free radical graft polymerization initiators. It is another object of this invention to prepare polyolefin compositions having improved dye affinity by the graft polymerization of at least one monoethylenically unsaturated, heterocyclic, nitrogen-containing monomer onto a polyolefin backbone wherein high conversions of monomer to graft polymer is obtained. Still another object of this invention is to obtain a dyeable polyolefin graft copolymer that is capable of being shaped into articles having excellent properties. These and other objects of the invention are accomplished by grafting at least one ethylenically unsaturated monomer onto a polyolefin backbone polymer wherein at least one monomer is a monoethylenically unsaturated, heterocyclic, nitrogen-containing monomer.

The graft polymerization is accomplished by using, as a graft polymerization free radical initiator, a perester selected from the group consisting of t-butyl 2-ethyl perhexanoate, t-amyl 2-ethyl perhexanoate, t-butyl 3,5,5-trimethyl perhexanoate, t-amyl 3,5,5-trimethyl perhexanoate, t-butyl 2-ethyl perbutyrate, t-amyl 2-ethyl perbutyrate, t-butyl perisobutyrate and t-amyl perisobutyrate.

The perester free radical initiators employed in this invention are particularly efficient for the selective polymerization of ethylenically unsaturated monomers to graft polymers onto a polyolefin backbone. Higher ratios of graft polymerized monomers to non-graft polymerized monomers are obtained by using the perester free radical initiators described in this invention compared to using initiators commonly employed in the prior art.

DETAILED DESCRIPTION OF THE INVENTION

The polyolefins employed as the backbone polymer in the graft polymerization of this invention include polymers which contain a major proportion (i.e., greater than 50%) of polyolefins derived from 1-alkenes having from 2 to 8 carbon atoms and particularly 3 to 6 carbon atoms. Such polyolefins, therefore, include polyethylene, polypropylene, ethylene propylene block copolymers, ethylene butene-1 block copolymers, polybutene-1, poly (4-methylpentene-1), poly (3-methylbutene-1), and the like. The term polyolefin as used herein is, furthermore, intended to include copolymers of 1-alkene monomers with other copolymerizable monomers that constitute a minor proportion of the copolymer. Particularly useful polyolefin backbone polymers are those that are substantially crystalline polymers derived from 1-alkenes having from 3 to 8 carbon atoms i.e., polymers containing at least 25 percent, and preferably at least 50% crystallinity as determined by density-crystallinity relationships, a type of technique described by J. A. Gailey et al., SPE Technical Papers (ANTEC), Vol. IX, Session IV-1, pages 1 to 4, February 1963. The polyolefin base polymer may be in any physical form convenient for the graft polymerization process such as a powder, filament, pellet, fabric, etc.

In the graft copolymerization any monoethylenically unsaturated monomer may be grafted onto the polyolefin substrate and preferably at least one of the grafted monomers is a monoethylenically unsaturated, heterocyclic, nitrogen-containing monomer. Representative heterocyclic, nitrogen-containing monomers are vinyl pyridines, vinyl morpholinones and vinyl lactams such as vinyl pyrrolidones, N-vinyl succinimides and N-vinyl caprolactams. Examples of particular vinyl pyridines include 2-vinyl pyridine, 3-vinyl pyridine, 4-vinyl pyridine, 5-methyl-2-vinyl pyridine, 5-ethyl-2-vinyl pyridine, 2-methyl-5-vinyl pyridine, 2-ethyl-5-vinyl pyridine, 2-methyl-6-vinyl pyridine, 2-ethyl-6-vinyl pyridine, 2-isopropenyl pyridine, 5-propyl-2-vinyl pyridine and 2,4-dimethyl-6-vinyl pyridine. Vinyl morpholinones include N-vinyl-3-morpholinone, N-vinyl-5-methyl-3-morpholinone, N-vinyl-2-methyl-3-morpholinone, N-vinyl-5-phenyl-3-morpholinone and the like.

Useful vinyl lactams include N-vinylpyrrolidones such as N-vinyl-2-pyrrolidone itself, N-vinyl-5-methyl-2-pyrrolidone, N-vinyl-3,3-dimethyl-2-pyrrolidone, N-vinyl-4,4-dimethyl-2-pyrrolidone; N-vinylpiperidones such as N-vinyl-2-piperidone, N-vinyl-6-methyl-2-piperidone, N-vinyl-3,3-dimethylpiperidone and N- vinyl-caprolactam. Other heterocyclic, nitrogen-containing monomers are N-vinyl piperidine, 2-vinyl piperidine, 4-vinyl piperidine, N-vinyl phthalimide and N-vinyl carbazole.

Ethylenically unsaturated monomers that may be graft polymerized onto the polyolefin base polymer either individually or together with an ethylenically unsaturated, heterocyclic, nitrogen-containing monomer include styrenes, vinyl toluenes, ethylenically unsaturated carboxylic acid esters, vinyl esters, ethylenically unsaturated nitriles, vinyl halides, vinylidene halides, vinyl ethers, vinyl ketones, ethylenically unsaturated amines and ethylenically unsaturated carboxylic amides. Preferred monomers within the aforementioned classes of compounds are styrene, alpha-methyl styrene, vinyl-o,m, or p-toluene, acrylonitrile, methacrylonitrile, vinyl chloride, vinylidene chloride, alkyl acrylic and alkyl methacrylic esters wherein the alkyl portion contains 1 to 8 carbon atoms such as methyl acrylate, ethyl acrylate, butyl acrylate, methyl methacrylate, butyl methacrylate, dimethylaminoethyl methacrylate, t-butylaminoethyl methacrylate, vinyl acetate, vinyl propionate, vinyl ethyl ether, vinyl n-butyl ether, vinyl isobutyl ether, vinyl 2-chloroethyl ether, vinyl methyl ketone, vinyl ethyl ketone, vinyl butyl ketone, acrylamide and methacrylamide.

The graft polymerization reaction is performed with a perester free radical initiator such as t-butyl 2-ethyl perhexanoate, t-amyl 2-ethyl perhexanoate, t-butyl 3,5,5-trimethyl perhexanoate, t-amyl 3,5,5-trimethyl perhexanoate, t-butyl 2-ethyl perbutyrate, t-amyl 2-ethyl perbutyrate, t-butyl perisobutyrate and t-amyl perisobutyrate. The preferred graft polymerization initiator is t-butyl 2-ethyl perhexanoate (occasionally named "t-butyl peroctoate" or t-butyl peroxy 2-ethyl hexanoate). The perester graft polymerization initiators employed in this invention are known compounds. The perester initiator may be prepared in high yields by the reaction of any acyl halide, particularly an acyl chloride, with a hydroperoxide. For instance, t-butyl 2-ethyl perhexanoate may be prepared by reacting 2-ethyl hexanoyl chloride with t-butyl hydroperoxide in the presence of an alkali metal hydroxide such as sodium hydroxide.

The amount of graft polymerization initiator may vary from about 0.05 percent to about 5 percent or more, preferably 0.1 percent to about 3 percent by weight, based on the total weight of added polymerizable monomers. Amounts of free radical initiator in excess of 5 percent are not considered economical. The graft polymerization initiators employed in this invention are particularly efficient in selectively polymerizing the added polymerizable monomers to graft polymers onto the polyolefin substrate and thereby minimizing the amount of homopolymerization or random copolymerization of the added polymerizable monomers. This results in a high ratio of graft polymerized monomers to non-graft polymerized monomers. The term "non-graft polymerized monomers" is intended to define the added polymerizable monomers that polymerize by mechanisms other than graft polymerization.

Graft polymerization is accomplished in any desired manner by known graft copolymerization techniques. The monomer or monomers to be graft polymerized may be diluted in a solvent together with the polymerization initiator and this mixture added to the reaction medium containing a polyolefin backbone polymer which may be in a finely-divided powder form such as a fiber or filament.

A preferred form of graft polymerization is an aqueous dispersion technique wherein a pulverulent polyolefin is dispersed in an aqueous solution containing a surface active agent and then the monomer or monomers to be graft polymerized together with the free radical initiator are introduced in any way desired to the reaction medium. The monomer, singly or in combination with one or more other ethylenically unsaturated polymerizable monomers as well as the graft polymerization catalyst, may be added to the reaction vessel by incremental addition from time to time or all at once as a single charge. The graft polymerization is generally conducted at a temperature in the range of about 30° to 120° or more C., but generally in the range of about 70° to 100°C. If necessary, supra-atmospheric pressures may be used to maintain the liquid phase. The time of polymerization is not critical and may vary from about 10 minutes to 4 or more hours.

If the graft polymerization units accomplished by an aqueous dispersion technique wherein the substrate polymer powder is dispersed in an aqueous medium, the dispersing agent or surfactant may be nonionic, anionic or cationic. Preferred surfactants are the nonionic alkylphenoxypolyalkoxyalkanols having alkyl groups from about 7 to 18 carbon atoms and 6 to 60 or more alkoxy unijs such as heptylphenoxypolyethoxyethanols, octylphenoxypolyethoxyethanols and nonylphenoxypolyethoxyethanols.

After the graft copolymerization reaction, unreacted monomer may be removed from the reaction vessel by washing the product or by vacuum distillation. The grafted polyolefin may be removed from the reaction vessel, washed thoroughly with water and dried. Then the reaction product may be placed in a solvent for the non-grafted polymerized monomers such as ethanol, dimethylformamide or methyl ethyl ketone which selectively extracts any non-grafted polymerized monomers. Thereafter the reaction product is recovered, washed with water and dried in an oven. The dyeable polyolefin compositions are now ready for dye bath treatment and fabricating into the desired form.

Filaments can be spun from the graft polyolefin compositions by conventional spinning techniques. The graft compositions can be melt spun or solution spun and the filaments can then be stretched to orient the molecules and develop the desired tensile strength to the products. After shaping the graft compositions onto the filaments for other desired forms, dyeing with acid, pre-metallized or disperse dyes may be accomplished.

For purposes of illustrating the invention, the following examples are provided wherein, unless otherwise indicated, all parts and percentages are by weight.

EXAMPLE 1

In a polymerization vessel equipped with a stirrer, a thermometer, inlet and outlet tubes for inert gas, and a device for admitting reactants, a solution of 1250 ml. of distilled water containing 1.60 g. of t-octylphenoxypolyethoxyethanol having an average of 10 ethoxy groups as a surfactant was introduced. The mixture was heated to 90°C. and nitrogen was bubbled through while stirring to deaerate the system. Thereafter 500 g. of 76.4 parts of a crystalline polypropylene powder having a flow rate of 4.9 (ASTM–D–1238–62T), 21.0 parts of 4-vinyl pyridine and 2.6 parts of styrene were charged together with 0.5 percent, based on the weight of the 4-vinyl pyridine and styrene monomers, of t-butyl 2-ethyl perhexanoate. Heating at 90°C. was continued for one hour and at the end of this time the grafted polypropylene powder was removed by filtration, washed thoroughly with water and dried in a vacuum oven.

The total conversion of the 4-vinyl pyridine and styrene monomers to polymer was 87 percent. Non-grafted polymerized monomers were extracted with dimethylformamide in a Soxhlet apparatus. Analysis indicated that 68 percent of the charged monomers (78 percent of the polymerized monomers) were present in the reaction product as graft polymers. The ratio of graft polymerized monomers to non-graft polymerized monomers was 3.6 to 1. Thus t-butyl 2-ethyl perhexanoate was a very efficient catalyst for graft polymerization.

An inhibitor system comprising 0.1 percent (based on the weight of polypropylene) of 2,6-ditertiarybutyl 4-methyl phenol, 0.5 percent dilauryl thiodipropionate and 0.15 percent calcium stearate was blended into the dry grafted polymer powder and the mixture was passed through an extruder and pelletized. After melt spinning the fibers, the grafted polypropylene was prepared for dye bath treatment.

Prior to dyeing, the fiber was prescoured in an aqueous solution of 1.0 percent (OWF) of t-octylphenoxypolyethoxyethanol having an average of 10 ethoxy units and 1.0 percent (OWF) soda ash for about 30 minutes at 82°C. The abbreviation OWF means on the weight of the fiber or article. Thereafter the fiber was dyed in an aqueous dye bath containing 2 percent (OWF) Capracyl Red G (Du Pont), a neutral pre-metallized dyestuff, and then washed for 15 minutes at 60°C. in an aqueous solution of 1.0 percent (OWF) t-octylphenoxypolyethoxyethanol having an average of 10 ethoxy units. The fibers were dyed to a deep red shade.

Evaluation of the dyed fiber showed excellent light fastness, wash resistance and dry cleaning resistance properties.

EXAMPLE 2

For comparative purposes, this example employs conventional graft polymerization initiators.

a. Using the apparatus described in Example 1 and following the same procedure, a graft copolymer was prepared from 76.4 parts of the crystalline polypropylene polymer described in Example 1, 28.0 parts of 4-vinyl pyridine and 3.5 parts of styrene as the reactants and a mixture of 0.5 percent of lauryl peroxide and 0.10 percent of benzoyl peroxide as the graft polymerization catalysts. After polymerization, the total conversion of monomers to polymer was 90%. Analysis indicated that 38 percent of the charged monomers were present as a graft polymer. The ratio of grafted polymerized monomers to non-grafted polymerized monomers was 0.73 to 1. Although the total conversions of vinyl pyridine and styrene to polymers in Examples 1 and 2(a) were similar, the t-butyl 2-ethyl perhexanoate of Example 1 was unexpectedly superior as a graft polymerization initiator to enable a high percentage of monomers to be selectively converted to graft polymers.

b. Example 2(a) was repeated except that the monomer charge was equally divided into 5 incremental additions spaced 15 minutes apart. The total conversion of 4-vinyl pyridine and styrene to polymer was 91 percent, of which 47 percent was present as graft polymer. The ratio of graft polymer to non-graft polymer was 1.1 to 1.

c. In another run using the same apparatus and procedure described in Example 2(a) above with the exception that the graft polymerization initiator was lauryl peroxide in an amount of 1.64 percent, based on the weight of the monomers, the total conversion was calculated as 88 percent of which 29 percent represented the amount of charged monomers converted to graft polymer. Therefore, the ratio of graft polymerized monomers to non-graft polymerized monomers was 0.49 to 1. This result was further evidence of the superior efficiency of t-butyl 2-ethyl perhexanoate as a graft polymerization initiator.

Example 3

The graft polymerization technique of Example 1 was repeated by adding a single charge, 68.5 parts of the same crystalline polypropylene of Example 1, 28.0 parts of 4-vinyl pyridine, 3.5 parts of styrene and 0.5 percent, based on the weight of 4-vinyl pyridine and styrene, of t-butyl 2-ethyl perhexanoate. Polymerization was conducted at a temperature of 90°C. for one hour. Total conversion of monomers to polymer was 87 percent and 65 percent of the charged monomers were graft polymerized. Thus, the ratio of graft polymerized monomers to non-graft polymerized monomers was 3.0 to 1.

Example 4

The procedure of Example 1 was followed except that 65.0 parts of the crystalline polypropylene described in Example 1, 17.5 parts of 4-vinyl pyridine and 17.5 parts of styrene were charged together with 0.5 percent of t-butyl 2-ethyl perhexanoate as polymerization initiator. After heating the reaction mixture for one hour at 90°C., the total conversion of monomers to polymers was found to be 96 percent. It was determined that 66 percent of the charged 4-vinyl pyridine and styrene monomers were present as grafted polymer and the ratio of graft polymerized monomers to non-graft polymerized monomers was 2.2 to 1.

Example 5

Using the same apparatus as in Example 1 and the same polymerization procedure, the following reactants were charged to the polymerization vessel containing 1250 ml. of distilled water containing 1.60 g. of a nonionic t-alkylphenoxypolyethoxyethanol surfactant: 500 g. of 76.4 parts of crystalline polypropylene described in Example 1, 21.0 parts of 2-methyl-5-vinyl pyridine and 2.6 parts of styrene. Polymerization was conducted at 90°C. for a period of one hour using 0.5 percent, based on the total weight of the charged monomers, of t-butyl 2-ethyl perhexanoate as the free radical initiator for the graft polymerization. The total conversion of monomers to polymer was calculated as 91 percent of which 62 percent of the charged monomers (or 68 percent of the polymerized monomers) were present as grafted polymer. Therefore, the ratio of graft polymerized monomers to non-graft polymerized monomers was 2.1 to 1.

Example 6

In the apparatus described in Example 1, 382 g. of the crystalline polypropylene described in Example 1 were charged to the reaction vessel containing 1250 ml. of a solution of distilled water and 1.60 g. of t-octylphenoxypolyethoxyethanol as a surfactant. Stirring dispersed the polypropylene powder throughout the solution and then a monomer charge of 105 g. of 4-vinyl pyridine and 13 g. of styrene together with 0.5 percent, based on the total weight of the monomers, of t-butyl 2-ethyl perhexanoate were incrementally introduced into the polymerization vessel in 5 equal additions spaced 15 minutes apart while the temperature in the reaction vessel was maintained at 90°C. The heating was continued for one hour after the final monomer addition. The graft polymer was recovered by the procedure described in Example 1. The total conversion of monomer to polymer was 84 percent and the conversion of charged monomers to graft polymerized monomers was 64 percent. The ratio of graft polymerized monomers to non-graft polymerized monomers was calculated as 3.2 to 1.

Example 7

The graft polymerization procedure of Example 1 was repeated with the exception that 2-methyl-5-vinyl pyridine was substituted for 4-vinyl pyridine but the same amount of styrene was employed. After polymerizing for one hour at 90°C., the graft copolymer was recovered and similar conversions to graft copolymer were obtained.

Example 8

Again the procedure of Example 1 was repeated using the same materials and quantities with the exception that the graft polymerization initiator was t-butyl 2-ethyl perbutyrate. After polymerizing for one hour at 90°C., the product was recovered from the reaction medium and selective conversion of the charged monomers to graft polymerized monomers was observed.

Example 9

Using the apparatus and following the procedure described in Example 1, 70 parts of the crystalline polypropylene described in Example 1 were charged to a reaction vessel containing an aqueous solution and a surfactant to disperse the polypropylene. While stirring, a monomer charge of 15 parts of N-vinyl-2-pyrrolidone and 15 parts of methyl acrylate was added together with 1.5 percent, based on the total weight of the monomer, of t-butyl 3,5,5-trimethyl perhexanoate. Good conversions to graft copolymer were obtained.

This example was repeated using 0.5 percent of t-amyl 2-ethyl perhexanoate as the graft copolymerization initiator and high conversions to graft copolymer were observed.

Example 10

In the polymerization apparatus of Example 1 and using the same procedure, 67.0 parts of pulverulent crystalline polypropylene described in Example 1, 17.5 parts of 2-methyl-5-vinyl pyridine and 15.5 parts of 4-vinyl pyridine together with 0.5 percent of t-butyl 2-ethyl perhexanoate were charged while the reaction temperature was maintained at 90°C. for one hour. A total conversion of monomer to polymer of 73 percent was obtained and 54 percent of the charged monomers were converted to graft copolymer. Therefore, the ratio of graft polymerized monomer to non-graft polymerized monomer was 2.8 to 1.

The above example was repeated except that the free radical initiator was t-butyl perisobutyrate and good conversions were obtained.

Example 11

Example 1 was repeated except that the alpha-olefin polymer was a propylene-ethylene terminal block copolymer having a flow rate of 4.0 and the free radical initiator was t-amyl perisobutyrate. Good conversions to graft copolymer were obtained.

Upon repeating the above example with t-amyl 2-ethyl perbutyrate as the free radical initiator, similar conversions to graft copolymer were obtained.

I claim:

1. In a process for the graft polymerization of at least one ethylenically unsaturated monomer onto a polyolefin wherein said polyolefin is derived from 1-alkenes having from 2 to 8 carbon atoms, the improvement wherein the free radical initiator for the graft polymerization is a perester selected from the group consisting of t-butyl 2-ethylperhexanoate, t-amyl 2-ethylperhexanoate, t-butyl 3,5,5-trimethylperhexanoate, t-amyl 3,5,5-trimethylperhexanoate, t-butyl 2-ethylperbutyrate, t-amyl 2-ethylperbutyrate, t-butyl perisobutyrate and t-amyl perisobutyrate, the amount of said perester being about 0.05% or more, based on the weight of said monomer.

2. A process according to claim 1 wherein at least two different monoethylenically unsaturated monomers are graft polymerized onto a polyolefin, one of said monomers being a monoethylenically unsaturated, heterocyclic, nitrogen-containing monomer selected from the group consisting of vinyl pyridines, vinyl morpholinones and vinyl lactams.

3. A process according to claim 2 wherein said monoethylenically unsaturated, heterocyclic, nitrogen-containing monomer is a vinyl pyridine.

4. A process according to claim 3 wherein said pyridine is selected from the group consisting of 4-vinyl pyridine and 2-methyl-5-vinyl-pyridine.

5. A process according to claim 1 wherein said polyolefin is polypropylene and said perester is t-butyl 2-ethylperhexanoate.

6. A process according to claim 1 wherein said ethylenically unsaturated monomer is a vinyl pyridine and said perester is t-butyl 2-ethylperhexanoate.

7. A process according to claim 1 wherein said polyolefin is polypropylene.

8. A process according to claim 1 wherein said polyolefin is polypropylene, one of said monomers is a vinyl pyridine and another of said monomers is styrene and said perester is t-butyl 2-ethylperhexanoate.

9. A process according to claim 1 wherein the amount of said perester may vary from about 0.05 percent to about 5 percent by weight, based on the total weight of said ethylenically unsaturated monomer.

10. A process according to claim 1 wherein said polyolefin is polypropylene, said perester is t-butyl 2-ethylperhexanoate and the amount of said perester may vary from about 0.1 percent to about 3 percent by weight, based on the total weight of said ethylenically unsaturated monomer.

* * * * *

PO-1050
(5/69)

UNITED STATES PATENT OFFICE
CERTIFICATE OF CORRECTION

Patent No. 3,728,417     Dated  April 17, 1973

Inventor(s) Donald F. Knaack

It is certified that error appears in the above-identified patent and that said Letters Patent are hereby corrected as shown below:

Column 1, line 5:   "of" should be  -- for --

Column 1, line 55:  "is" should be  -- are --

Column 4, line 25:  "units" should be -- is --

Column 4, line 32:  "unijs" should be -- units --

Column 5, line 32: "the", first occurrence, should be -- into --.

Column 9, line 5 up to and including line 8 should be canceled.  Column 10, line 1, "10" should read -- 9 --.

Signed and sealed this 20th day of November 1973.

(SEAL)
Attest:

EDWARD M. FLETCHER, JR.      RENE D. TEGTMEYER
Attesting Officer            Acting Commissioner of Patents